United States Patent [19]

Healey

[11] Patent Number: 4,955,013
[45] Date of Patent: Sep. 4, 1990

[54] OPERATING A MULTIPLE-ACCESS OPTICAL NETWORK

[75] Inventor: Peter Healey, Ipswich, England

[73] Assignee: British Telecommunications plc, London, England

[21] Appl. No.: 95,173

[22] PCT Filed: Dec. 5, 1986

[86] PCT No.: PCT/GB86/00741

§ 371 Date: Jul. 27, 1987

§ 102(e) Date: Jul. 27, 1987

[87] PCT Pub. No.: WO87/03761

PCT Pub. Date: Jun. 18, 1987

[30] Foreign Application Priority Data

Dec. 6, 1985 [GB] United Kingdom ............... 8530087

[51] Int. Cl.$^5$ ............................................. H04B 9/00
[52] U.S. Cl. ............................................. 370/1; 342/15; 455/607; 455/600
[58] Field of Search .............. 370/3, 1, 4; 455/601, 455/607, 606, 1, 206, 612, 600; 375/3; 342/14, 15; 380/6

[56] References Cited

U.S. PATENT DOCUMENTS

| 3,718,765 | 2/1973 | Halaby | 380/6 |
| 4,317,214 | 2/1982 | Attinello | 455/1 |
| 4,530,084 | 6/1985 | Strebel et al. | 370/3 |

FOREIGN PATENT DOCUMENTS

| 3423221 | 11/1984 | Fed. Rep. of Germany | 455/601 |
| 0204645 | 11/1983 | Japan | 455/601 |
| 2109654 | 10/1980 | United Kingdom | 370/3 |
| 2043240 | 6/1983 | United Kingdom | 370/3 |

OTHER PUBLICATIONS

"Designing with Low Cost Fibre Optic Links" by D. Knight, *Electronic Engineering*, vol. 55, No. 674, Feb. 1983, pp. 39-53, London, GB.

JP-A-58 204 645, Patent Abstracts of Japan, vol. 8, No. 49, (E-230) [1486], Mar. 6th, 1984, (Tokyo Shibaura Denki K.K.), 29-11, 1983.

"Optical Cascade Star Network—A New Configuration for Passive Districution System with Optical Collison Detection Capability" by Tamura et al., *J. Lightwave Technology*, vol. LT-2, No. 1, Feb. 1984, pp. 61-66.

"New Transmissive Star Couplers for Full Duplex Channels" by Healey et al., IOOC-ECOC, 1985, pp. 589-592.

*Primary Examiner*—Joseph A. Orsino
*Assistant Examiner*—L. Van Beek
*Attorney, Agent, or Firm*—Nixon & Vanderhye

[57] ABSTRACT

A method of operating a multiple-access network. The network has a number of communication stations having receiving and transmitting portions (1, 2: 3, 4: 5, 6). The stations are physically coupled together by optical waveguides and arranged such that each transmitting portion (1, 3, 5) can transmit signals to one or more receiving portions (2, 4, 6) but cannot transmit signals to the receiving portion of the same station. One method comprises enabling two stations to communicate with each other by transmitting information simultaneously in the same channel. Another method comprises enabling two stations to communicate with each other by causing the transmitting portion of one station to transmit an interfering signal in the same channel as the information transmitted by the transmitting portion of the other station, the interfering signal being such that at other receiving portions the information and interfering signals are received together.

13 Claims, 1 Drawing Sheet $$\begin{bmatrix} P_1 \\ P_3 \\ P_5 \end{bmatrix} = \frac{1}{(N-1)} \begin{bmatrix} 0 & 1 & 1 \\ 1 & 0 & 1 \\ 1 & 1 & 0 \end{bmatrix} \cdot \begin{bmatrix} P_2 \\ P_4 \\ P_6 \end{bmatrix}$$

Fig. 1.

$$\begin{bmatrix} P_1 \\ P_3 \\ P_5 \end{bmatrix} = \frac{1}{(N-1)} \begin{bmatrix} 0 & 1 & 1 \\ 1 & 0 & 1 \\ 1 & 1 & 0 \end{bmatrix} \cdot \begin{bmatrix} P_2 \\ P_4 \\ P_6 \end{bmatrix}$$

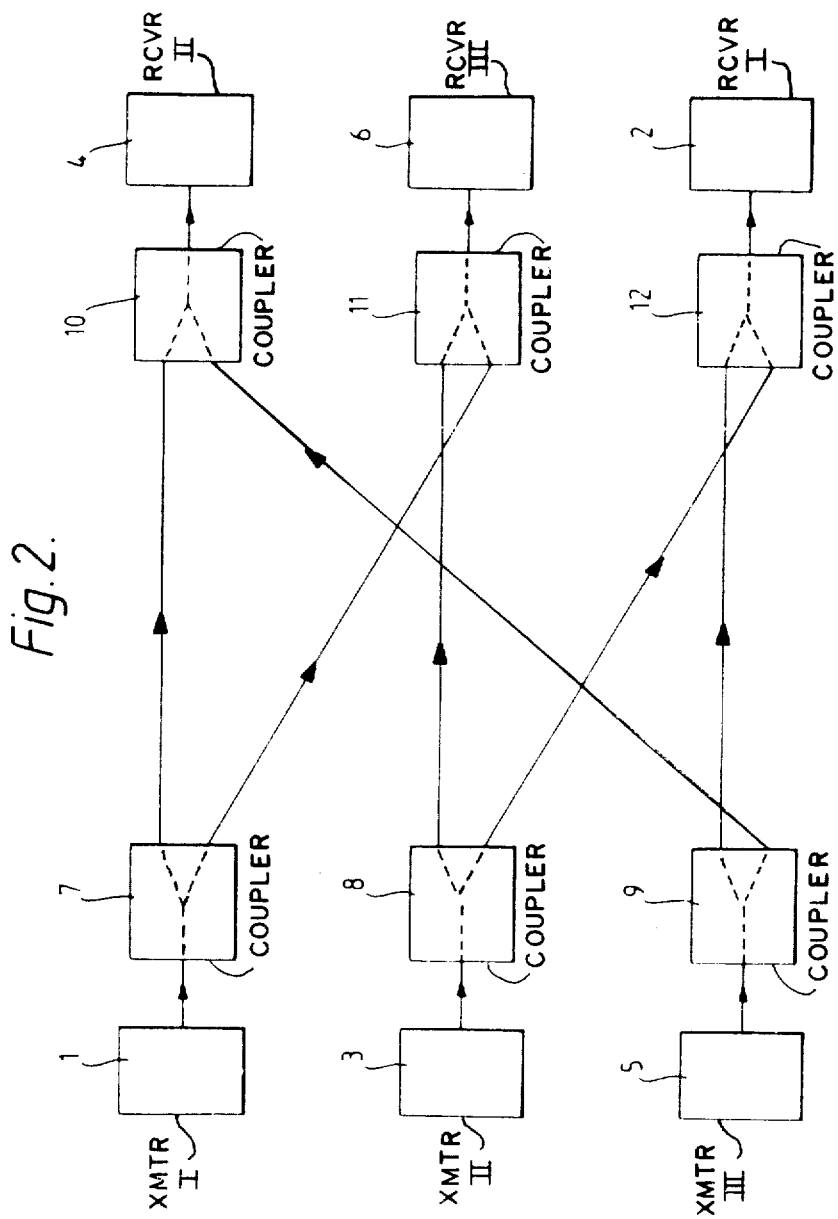

OPERATING A MULTIPLE-ACCESS OPTICAL NETWORK

A multiple-access optical network has a plurality of communication stations, the stations being physically coupled together by optical waveguides (usually optical fibres) and arranged such that ecah station can transmit signals to one or more of the other stations. Such communication networks are referred to as multiple-access (MA) networks since any station can receive signals from a number of the other stations.

Recently proposed multiple-access networks have been based on optical fibre links which offer a relatively secure, closed, transmission medium. However, one of the most attractive signal distribution schemes from a network insertion loss and reliability point of view, i.e. the transmission-star coupler, has a disadvantage of distributing information transmitted from one station to a number of the other stations. This information could be protected using data encryption techniques but this is costly.

In accordance with the present invention, a method of operating a multiple-access optical network having a plurality of communication stations, the stations being physically coupled together by optical waveguides and arranged such that each station can transmit signals to one or more of the other stations but cannot receive signals it has itself transmitted, comprises causing one station to transmit information over a selected channel to a receiving station an causing the receiving station to transmit simultaneously a signal over the same channel.

This invention finds use, for example, in the type of passive multiple-access network which is described in more detail in published GB patent application No. 2172165A, "Optical Signal Power Divider", of Faulkner and Healy, published on Sept. 10, 1986 and issuing on Mar. 1, 1989, in the name of British Telecommunications plc. The power dividing network described in that patent application sets out to reduce the number of communications channels required in a passive network by using a topology in which a transmitting station is unable to receive its own transmitted signal.

The present invention aims to provide a method of operating networks with passive network topologies in which a transmitting station cannot receive its own transmitted signal to provide a natural degree of data security.

In some cases, both stations may transmit information to each other over the same channel.

Thus, the method according to the present invention of causing one station to transmit information over a selected channel to a receiving station and causing the receiving station to transmit simultaneously a signal over the same channel, may comprise operating the network in full-duplex operation over a single transmission channel.

In this case, stations not associated with the two communication stations will receive both transmissions simultaneously and it will be very difficult for those stations to decipher the two simultaneous signals in such a busy channel, giving a degree of natural data security. The two communication stations, on the other hand, can use the same transmission channel without causing mutual interference.

In other cases, the method comprises causing the station which is to receive information to transmit an interfering signal in the same channel as the information transmitted by the other station, the interfering signal being received at each of the other stations which also receives the information.

This second arrangement provides a more secure transmission system than in the first cases mentioned above allowing each receiving station to protect its own incoming information by effectively blocking all other stations from receiving information in that channel.

Conveniently, the station transmitting information may monitor its own receiving channel to confirm that the interfering signal is present before information is transmitted.

The channels may be based on any multiple-accessing technique such as wavelength, frequency, time, or code division.

The physical connections between stations may be provided by optical fibres, typically monomode optical fibres.

The multiple-access network may include an optical signal divider in accordance with any of the examples describe in the afore-mentioned published GB patent application 2172165A, the divider comprising X input ports and N output ports; and coupling means for optically coupling each input port with N-Z output ports, where $N-Z>1$ and $Z>0$, whereby in use the signal power in each input port is divided between the respective N-Z output ports.

An example of a method of operating a multiple-access optical network according to the invention will now be described with reference to the accompanying drawings, in which:

FIG. 1 is a transfer matrix of a multiple-access network suitable for use with the invention; and FIG. 2 is a block diagram of a multiple-access network.

FIG. 1 illustrates a transfer matrix for a power divider for use in a multiple-access optical network. This illustrates that each one of the group input ports $P_1$, $P_3$, $P_5$ is connected to two ports of the group of output ports $P_2$, $P_4$, $P_6$ with the input power to each input port equally divided between each of the respective two output ports. For example, the input port $P_1$ is connected to the output ports $P_4$, $P_6$. It should be noted that the input port $P_1$ is not connected with the output port $P_2$. This feature leads to a number of advantages including a fifty per cent saving in the number of transmission channels if full-duplex operation is required. In addition, collision detection network access procedures may be greatly simplified since a collision would be indicated by the simultaneous reception of signals in a busy station's transmission channel. The looped signal paths which can occur in interconnected transmissive style networks can also be prevented with these new networks if multiple routes between transmissive star couplers are avoided.

An example of a multiple-access network using an optical power divider based on the FIG. 1 transfer matrix is shown in FIG. 2. The network shown in FIG. 2 has three transmitting/receiving stations comprising respective pairs of transmitting and receiving portions 1, 2; 3, 4; nd 5, 6. For clarity, the different portions 1–6 have been separated in the drawing although in practice the corresponding transmitting and receiving portions will be physically associated and may be widely spaced from other stations.

Each transmitting portion 1, 3, 5 feeds signals to an input port of a respective coupler 7, 8, 9. The output ports of each coupler are connected to respective pairs of Y couplers 10, 11, 12 whose outputs are connected to respective receivers 4, 6, 2. For example, the output ports of the coupler 7 are connected to input ports of the couplers 10, 11. It will thus be seen that the transmitting portion 1 is physically incapable of transmitting signals to the receiving portion 2.

Typically, the singals transmitted will be optical signals in which case the connections between couplers may be provided by optical fibres.

Consider an example where the station having transmitting/receiving portions 1, 2 wishes to communicate with the station having transmitting/receiving portions 3, 4. Initially, a suitable channel (A) is chosen which may be based on any multiple-access technique, mentioned above, for example, a TDMA system may be used.

As previously explained, if the transmitting portion 1 transmits information on channel A this will be received not only by the receiving portion 4 but also by the receiving portion 6. If simultaneous communication between stations is required then the same channel A can be used by both transmitting portions 1, 3 since the respective receiving portions 2, 4 will not receive information from the associated transmitting portion. However, the receiving portion 6 will receive information in the same channel from both transmitting portions 1, 3. This will make it very difficult for the receiving portion 6 to determine the nature of the information.

Alternatively, where non-simultaneous communication is required a different method may be used. If the transmitting portion 1 is to transmit information to the receiving portion 4 on channel A, the transmitting portion 3 transmits an interfering signal on the same channel, channel A, as the information from the transmitting portion 1. This interfering signal will be received by the receiving portions 2, 6 but not by the receiving portion 4. Thus the receiving portion 4 is free to receive the information transmitted by the transmitting portion 1. The interfering signal is chosen to have the maximum interference effect. If a TDMA system using pulse-position-modulation is used, the interfering signal could be provided by a random pulse position signal.

In some cases, the transmitting portion 1 may delay sending information until its associated receiving portion 2 has detected the existence of the interfering signal on channel A.

I claim:

1. A method of operating a multiple-access optical network having at least three communication stations, the stations being physically coupled together by optical waveguides arranged such that each station can transmit signals to plural of the other stations over information transfer channels based on a multiple-access technique but cannot receive signals it has itself transmitted, the method comprising:
   causing one station to transmit information using a selected information transfer channel to a receiving station; and
   causing the receiving station to transmit simultaneously a signal using the same information transfer channel whereby other stations also receiving on the same information transfer channel receive a confusing mixture of transmissions from said one station and from said receiving station.

2. A method according to claim 1, further comprising communicating between said one station and said receiving station by transmitting information simultaneously therebetween using the same information transfer channel.

3. A method according to claim 1, further comprising causing the station which is to receive information to transmit an interfering signal in the same channel as the information transmitted thereto by the said one station, the interfering signal being received at each of the other stations which also receives the information.

4. A method according to any one of claims 1 to 3, wherein the channels are based on one of the wavelength, frequency, time, or code division system.

5. A method according to any one of the preceding claims 1, 2 or 3 wherein the network includes an optical signal power divider comprising X input ports and N output ports; and coupling means for optically coupling each input port with N-Z output ports, where N-Z>1 and Z>0, whereby in use the signal power in each input port is divided between the respective N-Z output ports.

6. A method according to any of the preceding claims 1, 2 or 3 of operating a passive multiple-access optical network, 7. A method according to claim 6 of operating a transmissive star network.

8. A method for enhancing communication security between a pair of communication stations (I, II) in a multiple access communication network wherein at least three communication stations (I, II, III), each having a signal transmitter and a signal receiver, are physically linked by fixed communication paths which permit signal transmission from each station to plural other stations over selectable signal transmission channels but which stations can not receive their own signal transmissions via said fixed communication paths, said method comprising the steps of:
   transmitting first signals from a first station (I) to a second station (II) and to at least one other station (III) over said fixed paths using a selected signal transmission channel (A);
   simultaneously transmitting second signals from said second station (II) to said first station (I) and to said at least one other station (III) over said fixed paths also using the same said selected signal transmission channel (A) thereby causing said at least one other station (III) to receive a confusing mixture of said first and second signals while the first station receives only said second signals and while said second station receives only said first signals.

9. A multiple access communication network comprising:
   at least three stations each including a receiver and an associated transmitter, each said receiver being physically connected to the transmitter of every station in the network except that of its own associated transmitter;
   each said associated transmitter including means for transmitting first signals to another station receiver on a selected channel; and
   each said receiver including means for receiving said first signals from another station transmitter and for causing its own said associated transmitter to transmit, simultaneously to the said another station which transmitted the first signals, second signals on said selected channel, whereby the remaining stations all receive a confusing mixture of said first and second signals on said selected channel.

10. A network as in claim 9, comprising an optical network wherein said stations are connected by optical waveguides.

11. A network as in claim 10, wherein said channel is based on a wavelength or frequency division multiplex system.

12. A network as in claim 10, wherein said channel is based on a time division multiplex system.

13. A network as in claim 10, wherein said channel is based on a code division multiplex system.

* * * * *